(No Model.)
J. J. DEAL.
CULTIVATOR.
No. 268,358. Patented Nov. 28, 1882.
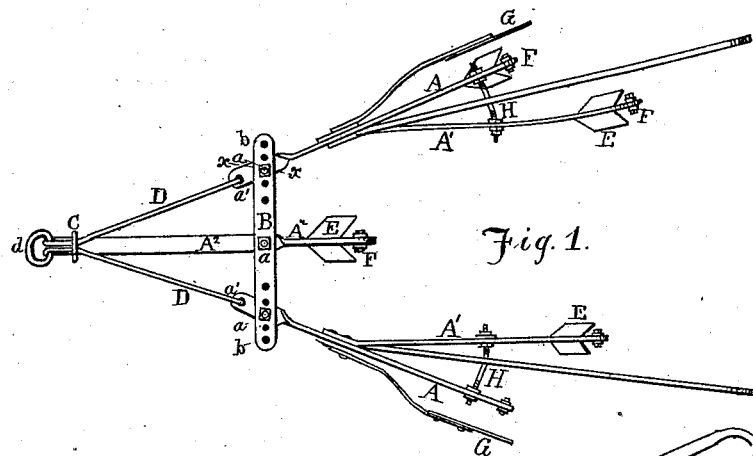
Fig. 1.
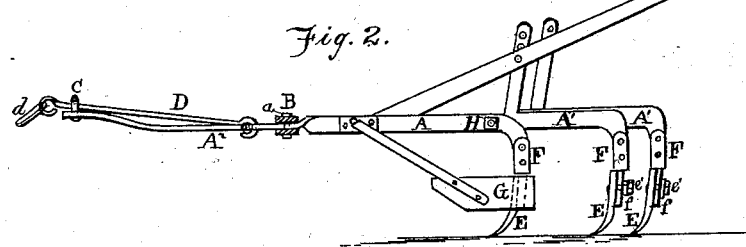
Fig. 2.
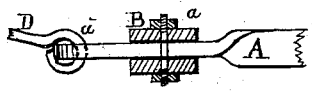
Fig. 3.
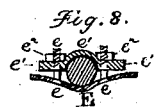
Fig. 8.
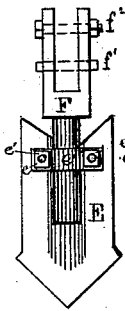
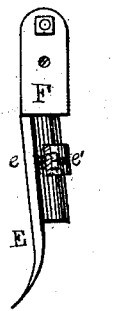
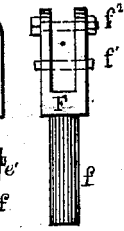
Fig. 4.  Fig. 5.  Fig. 6.  Fig. 7.
Witnesses
O. C. Hill.
W. H. Singleton.
Inventor
Josiah J. Deal
Per Wm. R. Singleton

United States Patent Office.

JOSIAH J. DEAL, OF WILMOT, OHIO, ASSIGNOR OF TWO-THIRDS TO WILLIAM M. JOHNSTON, OF SAME PLACE.

CULTIVATOR.

SPECIFICATION forming part of Letters Patent No. 268,358, dated November 28, 1882.

Application filed July 6, 1882. (No model.)

*To all whom it may concern:*

Be it known that I, JOSIAH J. DEAL, a citizen of the United States, residing at Wilmot, in the county of Stark and State of Ohio, have invented certain new and useful Improvements in Corn-Cultivators, of which the following is a specification, reference being had therein to the accompanying drawings.

This invention relates to corn-cultivators; and it consists in certain improvements in the construction of the several parts, which will be hereinafter more fully described, and set forth in the claim.

In the drawings accompanying and forming a part of this specification, Figure 1 is a plan view of a cultivator. Fig. 2 is a side view of the same. Fig. 3 is an enlarged view of the manner of pivoting the plow-beams with the double back bar and the joining of the draft-rods. Figs. 4, 5, 6, 7, and 8 are the several details of the manner in which the shovels are attached to the boots or standard and the plow-beams.

A A are the main plow-beams, A' A' are the branch beams, and $A^2$ is the middle beam. These beams are pivoted to a double bar, B, by bolts $a\ a\ a$ in holes $b\ b\ b$, of which there are several at each end of the double bar B, to narrow or widen the two outer beams, A A, as may be required for the work to be performed. The middle beam, $A^2$, extends to the front, and near the front end is a loop, C, fastened to it in any convenient manner, and through it the ends of the draft-rods D D are passed, having attached to them the hook or ring $d$ for hitching the horse or team. The other ends of draft-rods D D are fastened to the front ends, $a'\ a'$, of the main plow-beams A A. By this arrangement of attaching the draft-rods immediately to the inner ends of the plow-beams, which are pivoted in the double bar B, two purposes are accomplished, which add greatly to the value of this style of cultivator: First, the pull being immediately upon the plow-beams, the bolts which hold them in the bar are not strained, and will not break; secondly, the pull upon the forward ends of the beams being toward the middle, the handles are constantly strained outwardly. Hence the driver has a steady outward force always against his hands. Hence, also, when wishing to narrow, he is certain to do that just as much only as is necessary, and at any moment, by relaxing his own force inwardly, the pull of the animal will widen the shovels. In cultivators simply pivoted in the frame there is no certainty in the run of the shovels, as the irregularities of the ground cause the beams to work in and out constantly, and when the crop is low causes much damage.

This invention is designed to obviate these difficulties to a great extent, and has succeeded in actual practice. I use two draft-rods by preference; but one piece of rod may be bent and the loop passed through C. With two rods there is greater freedom of action, as they are independent of each other when the handles are moved by the driver for narrowing or otherwise. The plow-shovels E are fastened to the round shank $f$ of the boot or standard F by bolts $e\ e$, which pass through straps $e'\ e'$ to be placed on the back of shovels E, and are fastened by screw-bolts $e^2\ e^2$. The purpose of this construction and arrangement is to give the shovels any angle to the line of draft which may be desired and there to secure them, which is done upon the cylindrical shank $f$ by the bolts and nuts $e\ e^2$ and strap $e'$. The round part $f$ is not in a direct line with the axis of the upper part F, which is bolted to the beam, but is at a slight angle thereto, as seen in Fig. 6, where the line $y\ y$ shows the part $f$ to turn slightly to the left, and in Fig. 5 the same amount to the right. It will be seen, therefore, that by turning the upper part, F, upon the plow-beam and turning also the shovel, a different pitch will be given to the shovel, as seen in Fig. 5. The shovels are slightly rounded on the front in the middle, so that the corresponding concavity behind will fit the round shank $f$ of the boot or standard F to steady the shovel and prevent it from turning when once secured. The branch beams A' A' can be adjusted toward or from the main beams A A by the screw-bolts H H, which have at each end screw-threads and nuts each side of the beams, as seen in drawings, Fig. 1. The lower pin, $f'$, of the boot F is made of wood, that it may break whenever the shovel encounters any obstacle, so as not to injure more important and expensive parts of the cultivator.

I am aware that reversible teeth for harrows are not new, as shown in the patent of Reiner, December 21, 1880, and of Prindle, May 11, 1880; and I do not claim broadly reversibility in the blades of cultivators; but What I do claim is—

In cultivators, the boot or standard F, having its lower section, $f$, cylindrical and at an angle to the upper section, and which is made to be reversible upon the beam, so that when reversed the angle of the blade will be changed, substantially as and for the purpose described.

In testimony whereof I affix my signature in presence of two witnesses.

JOSIAH J. DEAL.

Witnesses:
OMAN E. JOHNSTON,
WM. M. JOHNSTON.